(12) United States Patent
Moir

(10) Patent No.: US 9,140,819 B2
(45) Date of Patent: Sep. 22, 2015

(54) GRADIOMETER

(76) Inventor: Christopher I. Moir, Malvern (GB)

( * ) Notice: Subject to any disclaimer, the term of this patent is extended or adjusted under 35 U.S.C. 154(b) by 291 days.

(21) Appl. No.: 13/581,929

(22) PCT Filed: Mar. 1, 2011

(86) PCT No.: PCT/GB2011/050408
§ 371 (c)(1),
(2), (4) Date: Oct. 15, 2012

(87) PCT Pub. No.: WO2011/107792
PCT Pub. Date: Sep. 9, 2011

(65) Prior Publication Data
US 2013/0031975 A1 Feb. 7, 2013

(30) Foreign Application Priority Data

Mar. 1, 2010 (GB) .................................. 1003355.3
Feb. 25, 2011 (GB) .................................. 1103268.7

(51) Int. Cl.
*G01V 7/16* (2006.01)
*G01V 7/00* (2006.01)

(52) U.S. Cl.
CPC ... *G01V 7/16* (2013.01); *G01V 7/00* (2013.01)

(58) Field of Classification Search
CPC .............. G01V 7/00; G01V 7/02; G01V 7/16
USPC ........................................... 73/382 R, 382 G
See application file for complete search history.

(56) References Cited

U.S. PATENT DOCUMENTS

| 5,341,681 A | 8/1994 | Molny et al. |
| 5,357,802 A * | 10/1994 | Hofmeyer et al. .......... 73/382 G |
| 5,471,876 A | 12/1995 | Yano |
| 5,970,787 A | 10/1999 | Wignall |

(Continued)

FOREIGN PATENT DOCUMENTS

| CH | 395 754 | 12/1965 |
| CL | 200300547 | 3/2004 |

(Continued)

OTHER PUBLICATIONS

"Airborne Gravity 2004: Abstracts from the ASEG-PESA Airborne Gravity 2004 Workshop," "'Airborne Gravity 2004 Workshop' Record" (Lane et al.), pp. v-vi, "The GT-1A Mobile Gravimeter" (Gabell et al.), pp. 55-61, © 2004.

(Continued)

*Primary Examiner* — Peter Macchiarolo
*Assistant Examiner* — Nathaniel Kolb
(74) *Attorney, Agent, or Firm* — Marshall, Gerstein & Borun LLP

(57) ABSTRACT

Primarily (but not exclusively) in the field of natural resources exploration, there is a requirement to measure the absolute value and variation of gravity at a given point and over an area gradient, thereby detecting the presence of sub-surface anomalies which give rise to the variation in the measured gravity value. In order to provide a portable, accurate, efficient and cost effective method for making the measurements, a gravity sensing apparatus (ABCD) can be deployed using a variety of vehicles, such as (for example, but not limited to) an aircraft or helicopter, with compensation applied by a motion sensing apparatus (EFGH) to reduce or eliminate the effects of vibration and vehicle motion and structural flexure on the gravity and gravity gradiometry data.

18 Claims, 2 Drawing Sheets

(56) References Cited

U.S. PATENT DOCUMENTS

| | | | |
|---|---|---|---|
| 6,804,608 | B2 | 10/2004 | Lee et al. |
| 6,837,106 | B2 | 1/2005 | Etkin et al. |
| 7,559,149 | B2 | 7/2009 | Van Kann |
| 7,562,460 | B2 | 7/2009 | Van Kann et al. |
| 7,571,547 | B2 | 8/2009 | Van Kann et al. |
| 7,581,327 | B2 | 9/2009 | Van Kann et al. |
| 7,584,544 | B2 | 9/2009 | Van Kann et al. |
| 7,596,876 | B2 | 10/2009 | Van Kann |
| 7,624,635 | B2 | 12/2009 | Van Kann et al. |
| 7,627,954 | B2 | 12/2009 | Van Kann et al. |
| 7,637,153 | B2 | 12/2009 | Van Kann et al. |
| 7,714,584 | B2 | 5/2010 | Van Kann |
| 7,823,449 | B2 | 11/2010 | Van Kann et al. |
| 7,849,732 | B2 | 12/2010 | Pashley |
| 2004/0211255 | A1* | 10/2004 | Leeuwen et al. ............ 73/382 G |
| 2005/0160815 | A1 | 7/2005 | Lee |
| 2005/0197773 | A1* | 9/2005 | Brewster et al. .................. 702/2 |

FOREIGN PATENT DOCUMENTS

| | | |
|---|---|---|
| CL | 200402765 | 12/2005 |
| CL | 200700948 | 11/2007 |
| CL | 200700949 | 11/2007 |
| CL | 200700950 | 11/2007 |
| CL | 200700951 | 11/2007 |
| CL | 200700952 | 11/2007 |
| CL | 200702588 A1 | 5/2008 |
| CL | 200702591 A1 | 5/2008 |
| CL | 200702792 A1 | 5/2008 |
| CL | 200702585 A1 | 6/2008 |
| CL | 200702586 A1 | 6/2008 |
| CL | 200702587 A1 | 6/2008 |
| CL | 200702589 A1 | 6/2008 |
| CL | 200702590 A1 | 6/2008 |
| CL | 200702793 A1 | 6/2008 |
| CL | 200702794 A1 | 6/2008 |
| CL | 200702795 A1 | 6/2008 |
| CL | 200702796 A1 | 6/2008 |
| CN | 1693922 A | 11/2005 |
| NZ | 560700 A | 2/2011 |
| RU | 2178575 C2 | 1/2002 |
| RU | 2298211 C2 | 4/2007 |
| WO | WO-95/05614 A1 | 2/1995 |
| WO | WO-95/05615 | 2/1995 |
| WO | WO-03/032015 | 4/2003 |
| WO | WO 03032015 A1 * | 4/2003 |
| WO | WO-2003/079052 | 9/2003 |
| WO | WO-2007/038819 A1 | 4/2007 |
| WO | WO-2007/038820 A1 | 4/2007 |
| WO | WO-2007/038822 A1 | 4/2007 |
| WO | WO-2007/038825 A1 | 4/2007 |

OTHER PUBLICATIONS

"Air-Sea System II Gravity Meter," Micro-g LaCoste, A Division of LRS, 6 pages, Known to applicant prior to Mar. 1, 2010.
"Airborne 3D Full Tensor Gravity Gradiometry," Bell Geospace Air-FTG, 2 pages, Known to applicant prior to Mar. 1, 2010.
"Our Falcon Gravity Gradiometer Was Born to Fly," Falcon Gravity Gradiometer, Fugro, Retrieved from the internet at http://www.fugro-gravmag.com/Falcon/index.php on Nov. 12, 2012, © 2008-2010.
International Search Report in PCT/GB2011/050408 mailed May 25, 2012, 3 pages.
Patent Examination Report in AU Application No. 2011222724 dated Jan. 14, 2014.
Office Action in Chilean Application No. 2372-12 dated Nov. 5, 2014.
Office Action in Chinese Application No. 201180011719.X dated Nov. 24, 2014.
Examination Report in Columbian Application No. 27238 dated Apr. 29, 2014.
Office Action in Columbian Application No. 12-170639 dated Aug. 23, 2013.
Search Report in GB Application No. 1103268.7 dated Jun. 13, 2011.
Examination Report in GB Application No. 1103268.7 dated Nov. 17, 2014.
Office Action in MX Application No. MX/a/2012/009989 dated Apr. 15, 2013.
Office Action in Russian Application No. 2012141153/28(066333) dated Feb. 16, 2015.
Office Action in Chilean Application No. 2372-2012 dated Mar. 13, 2015.
Office Action in Colombian Application No. 12-170.639 dated Apr. 24, 2015.
Decision on Granting for Russian Application No. 2012141153/28(066333) dated Jun. 26, 2015.
Office Action in Chinese Application No. 201180011719X dated Jul. 16, 2015.

* cited by examiner

GRADIOMETER

BACKGROUND

Primarily (but not exclusively) in the field of natural resources exploration, there is a requirement to measure the absolute value and variation of gravity at a given point and over an area gradient, thereby detecting the presence of subsurface anomalies which give rise to the variation in the measured gravity value. In order to provide a portable, accurate, efficient and cost effective method for making the measurements, a gravity sensing apparatus can be deployed hosted by a variety of vehicles, such as (for example, but not limited to) an aircraft or helicopter, with compensation applied by a motion sensing apparatus to reduce or eliminate the effects of vibration and vehicle motion and structural flexure on the gravity and gravity gradiometry data.

To assist in the discussion of the background to the invention, the following definitions and calculations apply:—

One Standard Gravity is defined as the free-fall acceleration of a body at mean sea level and at a latitude of 45.5° and is 9.80665 m/s². In SI units, One Gal is a unit of acceleration, equal to 1 cm per sec squared. Therefore one milliGal (1/1000 of a Gal, and written mGal) is 1/1000 of 1 cm/s². Therefore 1 mGal is 1.0197 µg, and one Standard Gravity is 980.665 Gal.

The vertical gravity gradient (variation with height) above Earth's surface is approximately 3.1 µGal per meter of height, resulting in a maximum difference of about 2 Gal from the top of Mount Everest to sea level. Changes in latitude and elevation cause a variation of gravity value from (typically) 976 to 983 Gal.

For measurement of gravity go where the terrain is at mean sea level and at latitude Ø

$$g_\varnothing = 9.780327(1+0.0053024 \sin^2 \varnothing - 0.0000058 \sin^2 2\varnothing) \text{ m·s}^{-2}$$

However, the gravity sensor will be flying at (typically) 100 meters above mean sea level (AMSL). The first correction to this formula is therefore the free air correction (FAC), which accounts for heights above sea level. Gravity decreases with height, at a rate which near the surface of the Earth is such that linear extrapolation would give zero gravity at a height of one half the radius of the Earth, i.e. the rate is 9.80665 m·s⁻² per 3086 km. Thus:—

$$g_\varnothing = 9.780327(1+0.0053024 \sin^2 \varnothing - 0.0000058 \sin^2 2\varnothing) - h*3.086*10^{-6} \text{ m·s}^{-2}$$

where h=height in meters above mean sea level.

Note that for flat terrain above sea level a second term is added, for the gravity due to the extra mass. For this purpose the extra mass can be approximated by an infinite horizontal slab, and we get $2\pi G$ times the mass per unit area, i.e. $4.2\times 10^{-10}$ m³·s⁻²·kg⁻¹ (0.042 µGal·kg⁻¹·m²)) (the Bouguer correction).

For a mean rock density of (say) 2.67 g·cm⁻³ this gives $1.1\times10^{-6}$ s⁻² (0.11 mGal·m⁻¹). Combined with the free-air correction this means a reduction of gravity at the surface of circa 2 µm·s⁻² (0.20 mGal) for every meter of elevation of the terrain. (Note that the two effects would cancel at a surface rock density of 4/3 times the average density of the whole Earth.)

For the gravity below the surface we have to apply the free-air correction as well as a double Bouguer correction. With the infinite slab model this is because moving the point of observation below the slab changes the gravity due to it to an opposite value.

$$g_\varnothing = 9.8061999 - 0.0259296 \cos(2\varnothing) + 0.0000567 \cos^2(2\varnothing) \text{ m·s}^{-2}$$

Taking a geological example, the gravitational anomaly of an ore body of density contrast 300 kg m-3 and of dimension 200 meters buried at a depth of 100 meters would be circa $2*10^{-6}$ ms⁻², or 0.00002% of the normal Earth gravity field (0.2 µg).

Note that gradiometer data is usually presented scaled in Eotvos (Eo), where 1 Eo is 0.1 mGal/km. Thus the Eotvos is a unit of gravity gradient, and 1 Eotvos corresponds to $10^{-9}$ s⁻².

There are numerous examples in the prior art of mechanisms employed for the measurement of gravity (a gravimeter) (i.e. LaCoste & Romberg—Scintrex, Inc., AIR-SEA II Dynamic Gravity Meter). In the simplest (and possibly the oldest) form, a mass attached to a beam or a spring can be used, with the natural (linear) deflection of the beam or spring being proportional to the value of the gravity field applied to the beam or spring and associated mass. A degree of damping will be applied to the beam or spring, reducing the sensitivity but also the settling time.

In more recent times, the MEMS (Micro-Electro-Mechanical Systems) accelerometer and associated electronic interface provides a means of measuring small accelerations of the order discussed above.

When a gravimeter is used for airborne measurements, the multi-axis movements and structural flexure of the aircraft will modify the natural accelerations due to any change in gravity registered as the aircraft moves over terrain, and these modifications must be compensated for when the gravity data is processed. For example, vertical "bounce" caused by air turbulence will produce accelerations many times greater than those resulting from changes in the gravity value. Air turbulence and the resulting airframe movement will also cause the structure of the aircraft (principally the wings in relation to the fuselage) to flex, introducing vertical accelerations which will modify the gravity values read by the gravity sensors. With any given pilot, the aircraft will precess in a cyclic manner along its flight path at a frequency determined by the flight characteristics of the airframe and the human control lag employed. Variations in aircraft attitude will change the perceived "downward" direction through the aircraft floor, and therefore the gravimeter sensor must employ some form of attitude stabilisation in order to maintain a true vertical reference.

In practical terms, an aircraft will be used to survey a defined area, and normally in a fixed pattern of flight lines of known position and orientation. At the end of each line, the aircraft executes a turning manoeuvre to position itself for the next line. It is desirable to enter each line with a positionally stable sensor, and therefore (depending on the sensor damping employed) the aircraft will extend the approach path to the line start. This might result (for a relatively small survey area) in a large increase in the line length, increasing cost and reducing survey capability for a given fuel load, and therefore it is desirable to minimise the effects of settling time following an aircraft manoeuvre.

For measurement of the gravity gradient (a gradiometer), the sensors employed are of a similar nature to those used simply for gravity, but are usually more sensitive, and are often used in pairs mounted a defined distance apart, thereby allowing the gravity gradient to be measured.

Again in the prior art, there are examples of gradiometers (Air-FTG from Bell Geospace Ltd, Falcon from Fugro AS) which use pairs of accelerometers mounted at a (small) fixed distance apart (and in a temperature and attitude controlled enclosure) on a slowly rotating disc, thereby assisting in the process of noise cancellation and balancing out any differences in accelerometer sensitivity. Both systems use three co-located discs with a total of 12 accelerometers (4 per disc mounted 10 cm apart) in a single (large and heavy) attitude and temperature stabilised assembly. Published results of a comparison of the two systems (ASEG-PESA Airborne Gravity Workshop 2004, Australian Government, ISBN: 1 920871 13 6) show both systems to be capable of reporting gradients of the order 7 Eo with a 700 m cut-off (Air-FTG) and 8 Eo with a 400 m cut-off (Falcon) over a test area with a range of gradients up to 70 Eo.

U.S. Pat. No. 5,357,802 (Hoffmeyer) describes a gradiometer using pairs of accelerometers rotating on a disc at about 15 rpm, and suggests an increase in rotational speed would improve noise performance. US Patent application 20040211255, (Leeuwen H. et al, October 2004) describes a similar system using a single larger disc (0.6 meters diameter) with up to 72 accelerometers rotating at about 15 rpm, thereby improving noise performance over a smaller disc, and suggests sensitivities might be obtained in the order of 10 Eo. Cryogenic gravity gradiometers have been proposed using atomic resonance techniques, again mounted on attitude stabilisation platforms (ArKex Ltd, EGG System).

A common feature of most current and proposed gravity and gravity gradiometry systems is the size and weight of the apparatus—most are relatively large compared to the size of the typical (small) geophysics survey aircraft often employed to host them. A floor area of 2 square meters is common, with the combined weight of the sensor, thermal and attitude management systems and processing electronics approaching or often exceeding 200 kg. Relative to the scale of the geological features being measured, all are single point measurement systems.

SUMMARY OF THE INVENTION

In accordance with a first aspect of the present invention, there is provided a gradiometer including:

a first accelerometer arranged to generate a first acceleration signal;

a second accelerometer spaced from the first accelerometer and arranged to generate a second acceleration signal;

a first monitoring device having a known spatial relationship with the first accelerometer and being arranged to detect movement of the second accelerometer and to generate a first correction signal that is representative of the detected movement;

a controller arranged to modify the second acceleration signal based on the first correction signal to provide a modified second acceleration signal such that a gravity gradient can be measured using the first acceleration signal, or a modified version of the first acceleration signal, and the modified second acceleration signal.

The first monitoring device may have a substantially fixed spatial relationship with the first accelerometer The gradiometer may include:

a third accelerometer spaced from the first and second accelerometers and arranged to generate a third acceleration signal;

a second monitoring device having a known spatial relationship with the first or second accelerometer and being arranged to detect movement of the third accelerometer and to generate a second correction signal that is representative of the detected movement, wherein the controller is arranged to modify the third acceleration signal based on the second correction signal to provide a modified third acceleration signal such that a gravity gradient and angle can be measured using the first acceleration signal, the modified second acceleration signal and the modified third acceleration signal.

The second monitoring device may have a substantially fixed spatial relationship with the first or second accelerometer.

The first, second and third accelerometers may be positioned so as to form a generally equilateral triangle.

The first and/or second monitoring device may include a laser module arranged to direct a laser beam at a respective position sensor, one of the laser module and position sensor having a known spatial relationship with one of the first or second accelerometers and the other of the laser module and position sensor having a known spatial relationship with the accelerometer the movement of which is being detected.

The gradiometer may include:

a fourth accelerometer spaced from the first, second and third accelerometers, and having a known spatial relationship with the first accelerometer and being arranged to generate a fourth acceleration signal.

The fourth accelerometer may have a substantially fixed spatial relationship with the first accelerometer.

One or more of the accelerometers may be a semiconductor based accelerometer.

The gradiometer may include:

a GPS-driven inertial reference measurement system co-located with an accelerometer.

One or more of the accelerometers may each be mounted on an attitude stabilised platform.

A signal from the GPS-driven inertial reference measurement system may be provided to each attitude stabilised platform.

One or more of the accelerometers may each be mounted in a temperature stabilised enclosure.

In accordance with a second aspect of the present invention, there is provided a vehicle including a gradiometer according to the first aspect. The fourth accelerometer may be mounted at the approximate centre of gravity of the vehicle.

In accordance with a third aspect of the present invention, there is provided an aeroplane including a gradiometer according to the first aspect. The second accelerometer may be mounted on a first wing and the third accelerometer may be mounted on a second wing, each accelerometer being either mounted within the frame of the respective wing or in an aerodynamic pod.

In accordance with a fourth aspect of the present invention, there is provided a method of measuring a gravity gradient, the method including the steps of:

providing a first acceleration signal representative of an acceleration experienced by a sensor at a first location;

providing a second acceleration signal representative of an acceleration experienced by a second sensor at a second location that is spaced from the first location;

detecting movement of the second sensor to determine a first correction signal that is representative of the detected movement;

modifying the second acceleration signal based on the first correction signal to provide a modified second acceleration signal; and measuring a gravity gradient using the first acceleration signal, or a modified version of the first acceleration signal, and the modified second acceleration signal.

The method may include the steps of:

providing a third acceleration signal representative of an acceleration experienced by a third sensor at a second location that is spaced from the first and second locations;

detecting movement of the third sensor to determine a second correction signal that is representative of the detected movement;

modifying the third acceleration signal based on the second correction signal to provide a modified third acceleration signal; and measuring a gravity gradient and angle using the first acceleration signal and the modified second and third acceleration signals.

In accordance with a fifth aspect of the present invention, there is provided a gravimeter for a gradiometer according to the first aspect, the gravimeter including:

an accelerometer arranged to generate an acceleration signal;

a monitoring device having a known spatial relationship with a plane of reference and being arranged to detect movement of the accelerometer and to generate a correction signal that is representative of the detected movement;

a controller arranged to modify the acceleration signal based on the correction signal to provide a modified acceleration signal.

BRIEF DESCRIPTION OF THE DRAWINGS

The invention may be carried into practice in various ways, and one embodiment will now be described by way of example, together with variations, and with reference to the accompanying drawings, in which.

DESCRIPTION OF EMBODIMENTS OF THE INVENTION

Figure 1:
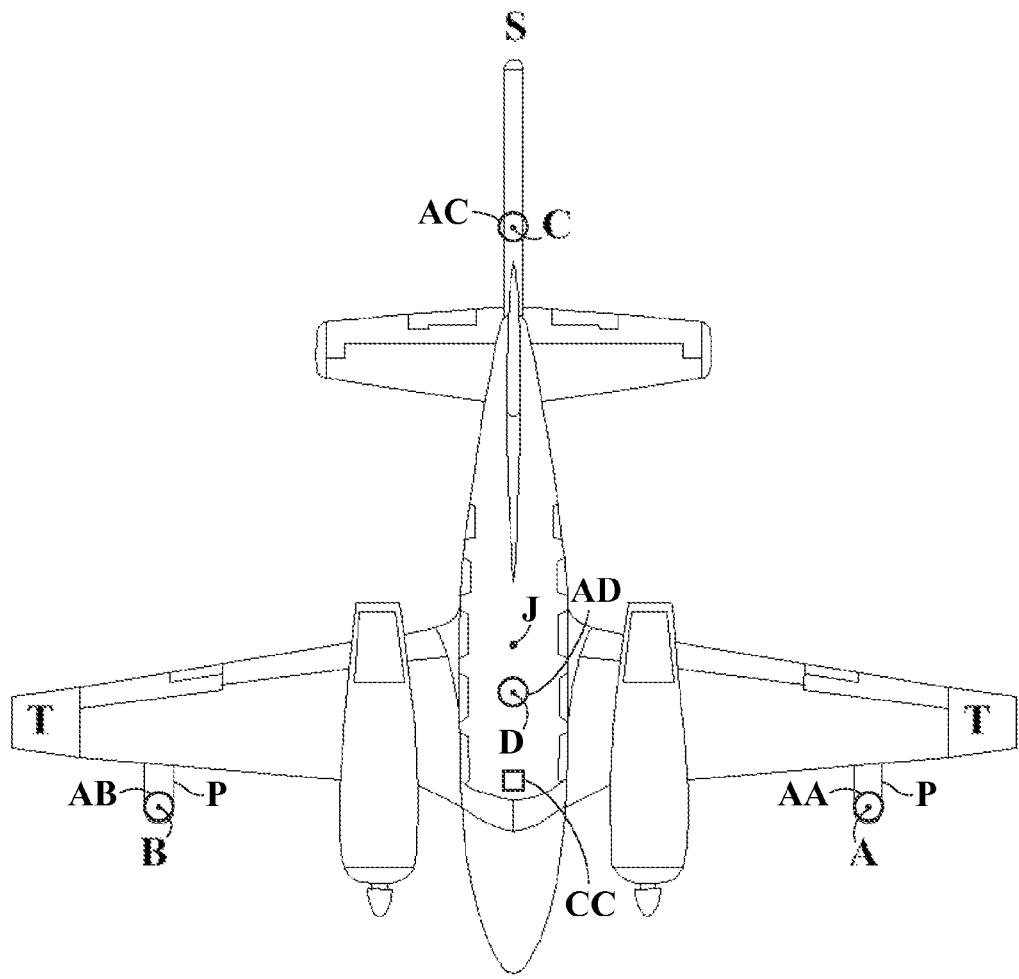
FIG. 1 is a diagrammatic top elevation of an aircraft using the apparatus according to the invention.

In order to provide a portable, accurate, efficient and cost effective method for making the measurements, a gravity sensing apparatus (ABCD) can be deployed using a variety of vehicles, such as (for example, but not limited to) an aircraft or helicopter, with compensation applied by a motion sensing apparatus (EFGH) to reduce or eliminate the effects of vibration and vehicle motion and structural flexure on the gravity and gravity gradiometry data.

In order to properly measure a gravity gradient, there are two requirements—to define a gradient in free space with a given compass orientation, and to measure the gravity value at the extremes of that gradient. Current methodology has focussed on creating stabilised sensors with extremely high sensitivity and low noise, effectively operating at a single point, and employing them over relatively small distances, set mainly by a consideration of the physical limitations imposed by the overall size of the equipment needed to support the sensor(s), the sample rate and the rate of travel over the terrain.

The alternative approach employed by the invention is to significantly increase the physical baseline of the gradient under measurement, and therefore (for the same sensor specification) allow a much smaller gradient to be measured. The increase in baseline would also allowing a reduction in the sensor specification but maintaining the same (or better) overall result as that obtained by a short baseline system.

Consider two gradients, the first 10 cm in length, the second 10 meters in length, and in the first case, with the gravity values at each end measured by a sensor having a pk-pk noise level of 0.1 mGal. With no smoothing, the least gradient that can be accurately measured (ignoring the sign) is 0.2 mGal in 10 cm, or 2 mGal/meter. Applying the same sensor to the 10 meter baseline, the least gradient reduces to 0.2/10=0.02 mGal/meter, some 100 times less.

In order to fully specify a gradient as a slope and an angle, at least three fixed points on a plane must be measured, thereby forming a triangle (FIG. 1, A B C), the average slope and direction of which can be computed from the point values. In the preferred embodiment, triangle (A B C) would be equilateral.

Theoretically, it would be possible to take three (current technology) single point gravimeters and attach them to the wingtips and tail of (say) an aircraft, thereby forming a sensor triangle, and thus allowing the gravity gradient to be measured at any given point in the flight. Practically, this is not possible, as a 200 kg mass at each of the suggested points would render the aircraft impossible to fly. However, what would be possible is to use three miniature, low noise semiconductor-based MEMS accelerometers, each mounted on a high speed attitude stabilised platform within a temperature stabilised enclosure. This solution would rely on accurate compensation of any vertical displacement of the sensor caused by wing "flap" due to air turbulence.

FIG. 1 shows the proposed configuration of a gravity gradiometer mounted within a fixed wing aircraft. Note that the same geometric configuration can be achieved using a helicopter or other air or ground vehicle and wired booms to support the sensors at similar distances from each other. In the aircraft embodiment discussed, sensors (A) and (B) are mounted in aerodynamic pods (P) attached to the wings of the aircraft, and a tail extension "stinger" (S) is mounted at the rear of the aircraft to hold sensor(s) for other geophysical technologies (i.e.; aeromagnetic sensing), with sensor (C) mounted within the stinger. A fourth sensor (D) is mounted at the approximate flight Centre of Gravity of the aircraft. The longitudinal stiffness of the tube formed by the airframe and stinger will limit the relative movement between sensors (C) and (D) to an acceptable minimum, and therefore sensors (C) and (D) will remain in a fixed position relative to the centreline of the fuselage. However, sensors (A) and (B) will (independently) move vertically (i.e. flap) on a radial path whose centre is close to the longitudinal centreline of the fuselage, this movement being inversely proportional to wing stiffness and mainly due to air turbulence, caused partly by vortex shedding at the wingtips. This effect can be reduced by adding upswept wingtips (T) to spoil the vortex formation, but the accelerations produced due to flapping of the wings will still be many times greater than those produced by changes in the normal gravity value.

For the proposed gravity gradiometer system to be practical, either a method of measuring the wing flap to a high degree of accuracy must be employed, and the resulting data used to compensate the output of sensors (A) and (B) in order to eliminate the flap induced errors, or a 3 axis stabilisation platform must be employed at sensors (A) and (B) in order to eliminate the unwanted vertical acceleration caused by wing flap. The latter is not considered to be practical due to the size, weight and complexity of such a platform, and the vertical axis compensation would need to be very fast and accurate in order to fully eliminate vertical bounce of the sensor body.

Figure 2:
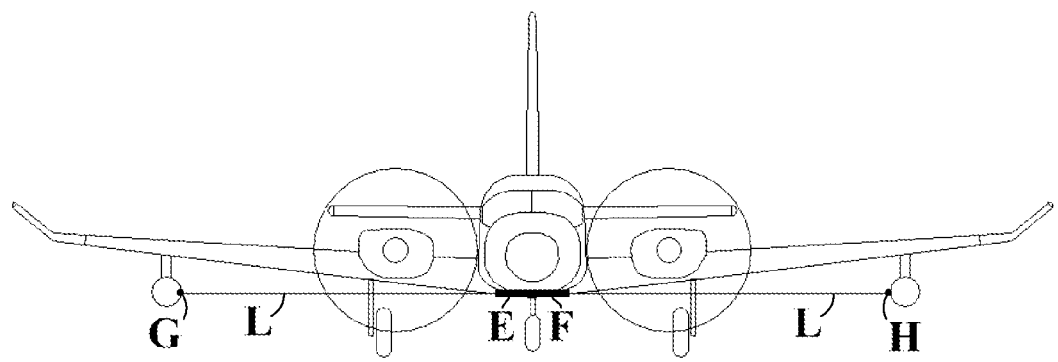
FIG. 2 is a diagrammatic front elevation of an aircraft using the apparatus according to the invention.
Figure 3:
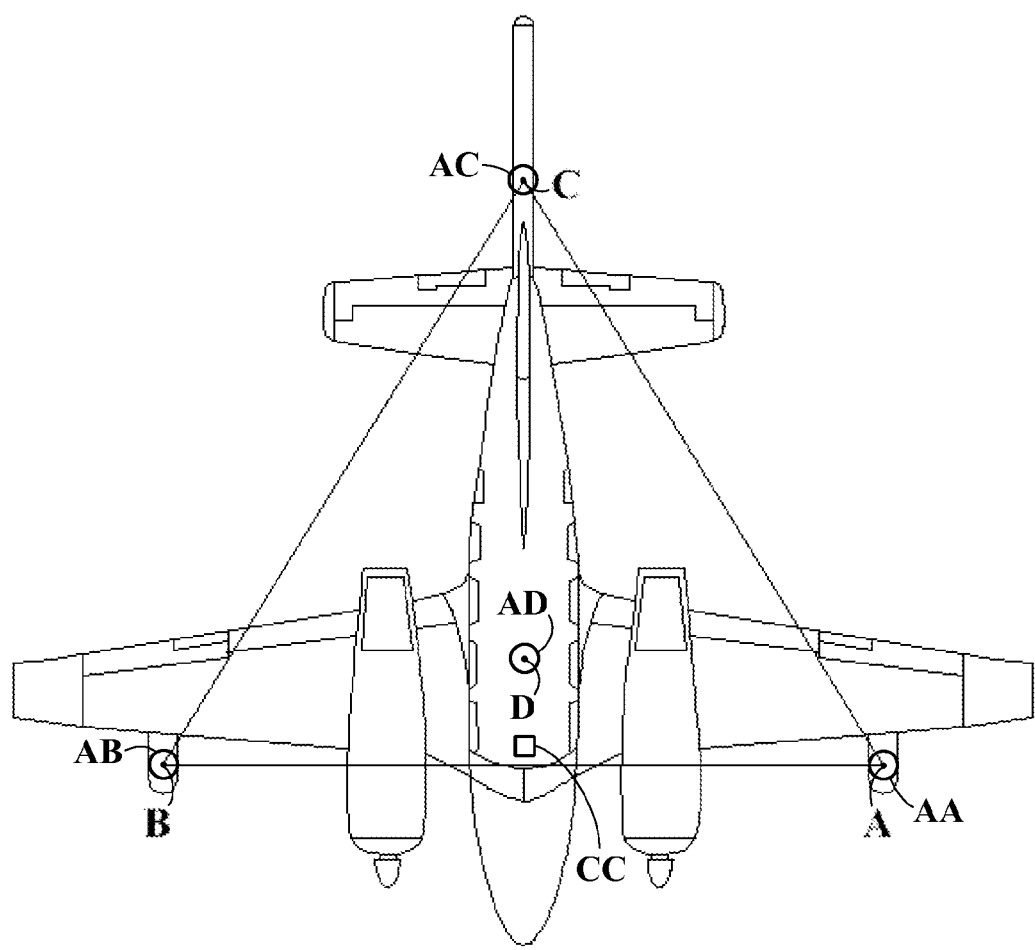
FIG. 3 is a diagrammatic top elevation of an aircraft using the apparatus according to the invention and illustrating the sensor triangle formed by elements of the apparatus.

FIG. 2 shows a front view of an aircraft which has been fitted with wing pods to hold the gravity sensors (A) and (B). The distance between the pods will depend on the aircraft used, but in the example shown, it is approximately 10 meters. There is a clear line-of-sight between the fuselage sides beneath the wings and the wing pods. In order to provide a means of accurately measuring wing flap, and in the preferred embodiment, a pair of laser transmitter modules (E) and (F) are mounted on either side of the fuselage with the laser beams (L) directed at beam position sensors (G) and (H) mounted within the wing pods.

As each wing deflects vertically with reference to the fuselage axis, the laser system measures the wing (pod) deflection to a high degree of accuracy (microns). The deflection signal is used to modify the outputs from sensors (A) and (B), thereby greatly reducing or eliminating the effect of wing flap on the sensor output. The speed of response of the laser system will be far greater than the response time of a 3 axis platform driven by a accelerometers adjacent to the (A) and (B) sensors and measuring the effect of wing flap, and therefore the compensation will be significantly more accurate, as the 3 axis accelerometers must also respond to the gravity signal. Also, the laser sensor registers movement which results in acceleration. Using this as compensation makes no change to the acceleration resulting from any change in gravity. Also the vertical gravity gradient (3.1 µGal/meter) will not be significant compared to any change in absolute height of the sensor caused by the movement, and therefore the method will be computationally robust, providing a clean compensation for wing flap.

In addition to gravity sensor (D), a GPS-driven inertial reference measurement system (J) is co-located with sensor (D) to provide a true downward reference direction through the aircraft floor. This data can also be fed to each of the attitude stabilisation platforms (AA), (AB), (AC) and (AD) for sensors (A) to (D) to compensate for any mechanical distortion which might otherwise change the downward reference direction at each sensor (for example, to compensate for any longitudinal twisting of the main wings which would otherwise introduce pitch errors in each sensor position).

Having applied all of the motion compensations, the data from each sensor can then be corrected for sensor height above mean sea level and if needed, Bouguer correction applied. The gravity gradient data derived from sensors (A B C) can then be superimposed on the gravity data from sensor (D), providing an absolute gravity reference throughout the terrain survey.

As will be appreciated from the foregoing description, while in the illustrated example the gradiometer includes sensors (A to D), in other embodiments the gradiometer may include two or more sensors, at least one of which is monitored by a monitoring device arranged to detect movement of the sensor and provide a correction signal to a controller (CC) for modifying the signal of the monitored sensor in accordance with the detected movement.

The invention claimed is:

1. A gradiometer comprising:
   a first accelerometer arranged to generate a first acceleration signal;
   a second accelerometer spaced from the first accelerometer and arranged to generate a second acceleration signal;
   a first monitoring device having a known spatial relationship with the first accelerometer and being arranged to detect movement of the second accelerometer with respect to the first accelerometer and to generate a first correction signal that is representative of the detected movement;
   a controller arranged to modify the second acceleration signal based on the first correction signal such that a gravity gradient can be measured using the first acceleration signal and the second acceleration signal.

2. A gradiometer according to claim 1, wherein the first monitoring device has a substantially fixed spatial relationship with the first accelerometer.

3. A gradiometer according to claim 1, further comprising:
   a third accelerometer spaced from the first and second accelerometers and arranged to generate a third acceleration signal;
   a second monitoring device having a known spatial relationship with the first or second accelerometer and being arranged to detect movement of the third accelerometer and to generate a second correction signal that is representative of the detected movement,
   wherein the controller is arranged to modify the third acceleration signal based on the second correction signal such that a gravity gradient and angle can be measured using the first, second and third acceleration signals.

4. A gradiometer according to claim 3, wherein the second monitoring device has a substantially fixed spatial relationship with the first or second accelerometer.

5. A gradiometer according to claim 3, wherein the first, second and third accelerometers are positioned so as to form a generally equilateral triangle.

6. A gradiometer according to claim 3, wherein the first and/or second monitoring device includes a laser module arranged to direct a laser beam at a respective position sensor, one of the laser module and position sensor having a known spatial relationship with one of the first or second accelerometers and the other of the laser module and position sensor having a known spatial relationship with the accelerometer the movement of which is being detected.

7. A gradiometer according to claim 3, further comprising:
   a fourth accelerometer spaced from the first, second and third accelerometers, and having a known spatial relationship with the first accelerometer and being arranged to generate a fourth acceleration signal.

8. A gradiometer according to claim 7, wherein the fourth accelerometer has a substantially fixed spatial relationship with the first accelerometer.

9. A vehicle including a gradiometer according to claim 7, wherein the fourth accelerometer is mounted at the approximate centre of gravity of the vehicle.

10. An aeroplane including a gradiometer according to claim 3, wherein the second accelerometer is mounted on a first wing and the third accelerometer is mounted on a second wing, each accelerometer being either mounted within the frame of the respective wing or in an aerodynamic pod.

11. A gradiometer according to claim 1, wherein one or more of the accelerometers is a semiconductor based accelerometer.

12. A gradiometer according to claim 1, further comprising a GPS-driven inertial reference measurement system co-located with an accelerometer.

13. A gradiometer according to claim 12 wherein one or more of the accelerometers are each mounted on an attitude stabilised platform, and
   wherein a signal from the GPS-driven inertial reference measurement system is provided to each attitude stabilised platform.

14. A gradiometer according to claim 1, wherein one or more of the accelerometers are each mounted on an attitude stabilised platform.

15. A gradiometer according to claim 1, wherein one or more of the accelerometers are each mounted in a temperature stabilised enclosure.

16. A gravimeter for a gradiometer according to claim 1, the gravimeter comprising:

an accelerometer arranged to generate an acceleration signal;

a monitoring device having a known spatial relationship with a plane of reference and being arranged to detect movement of the accelerometer and to generate a correction signal that is representative of the detected movement;

a controller arranged to modify the acceleration signal based on the correction signal to provide a modified acceleration signal.

17. A method of measuring a gravity gradient comprising:

providing a first acceleration signal representative of an acceleration experienced by a sensor at a first location;

providing a second acceleration signal representative of an acceleration experienced by a second sensor at a second location that is spaced from the first location;

detecting movement of the second sensor with respect to the first sensor to determine a first correction signal that is representative of the detected movement;

modifying the second acceleration signal based on the first correction signal; and measuring a gravity gradient using the first and second acceleration signals.

18. A method according to claim 17, further comprising:

providing a third acceleration signal representative of an acceleration experienced by a third sensor at a second location that is spaced from the first and second locations;

detecting movement of the third sensor to determine a second correction signal that is representative of the detected movement;

modifying the third acceleration signal based on the second correction signal; and measuring a gravity gradient and angle using the first and second acceleration signals.

\* \* \* \* \*